June 14, 1938. A. N. SPÁNEL 2,120,720
METHOD OF MAKING SHEET LATEX ARTICLES
Filed Nov. 14, 1934 2 Sheets-Sheet 2
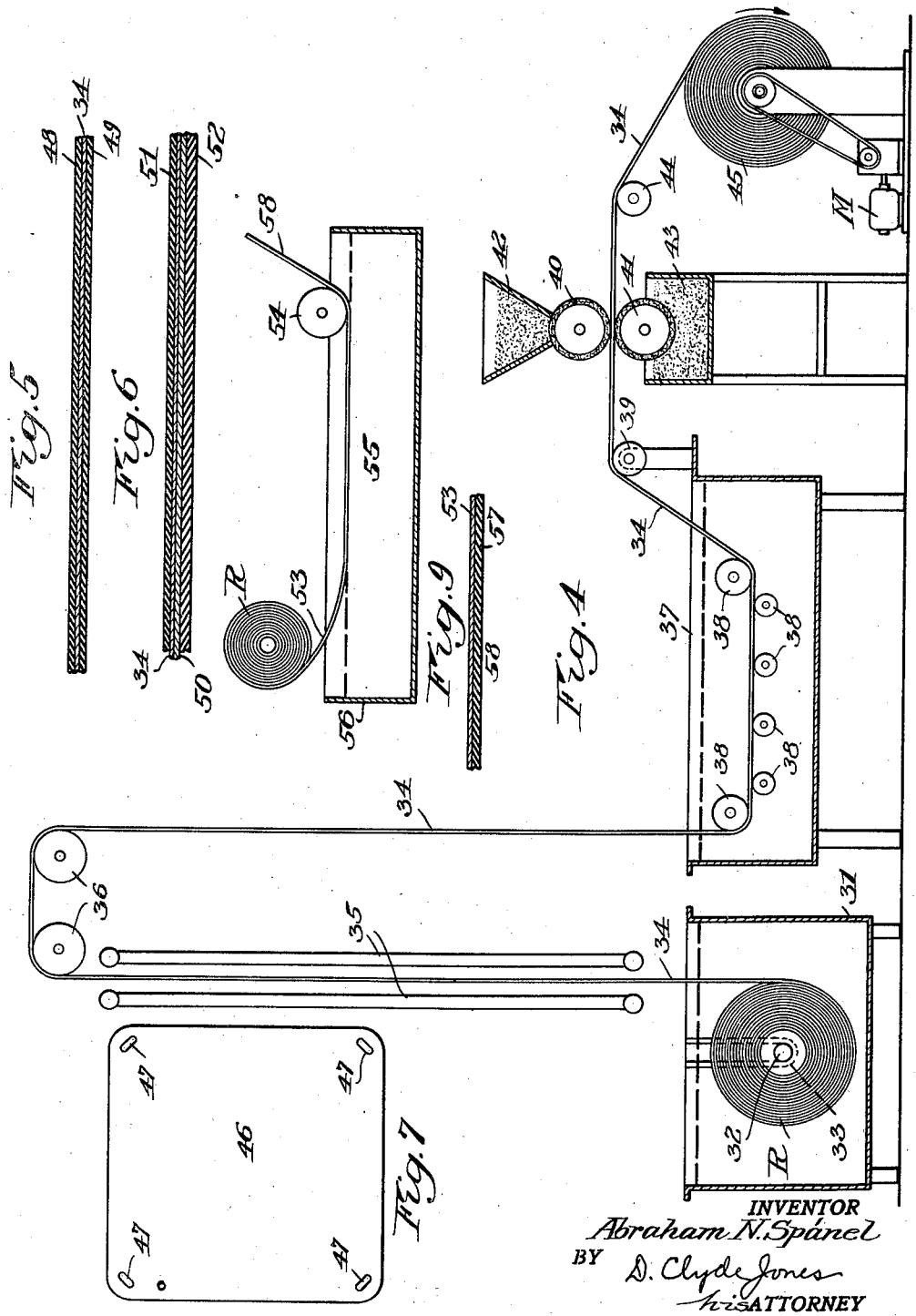
INVENTOR
Abraham N. Spánel
BY D. Clyde Jones
his ATTORNEY Patented June 14, 1938

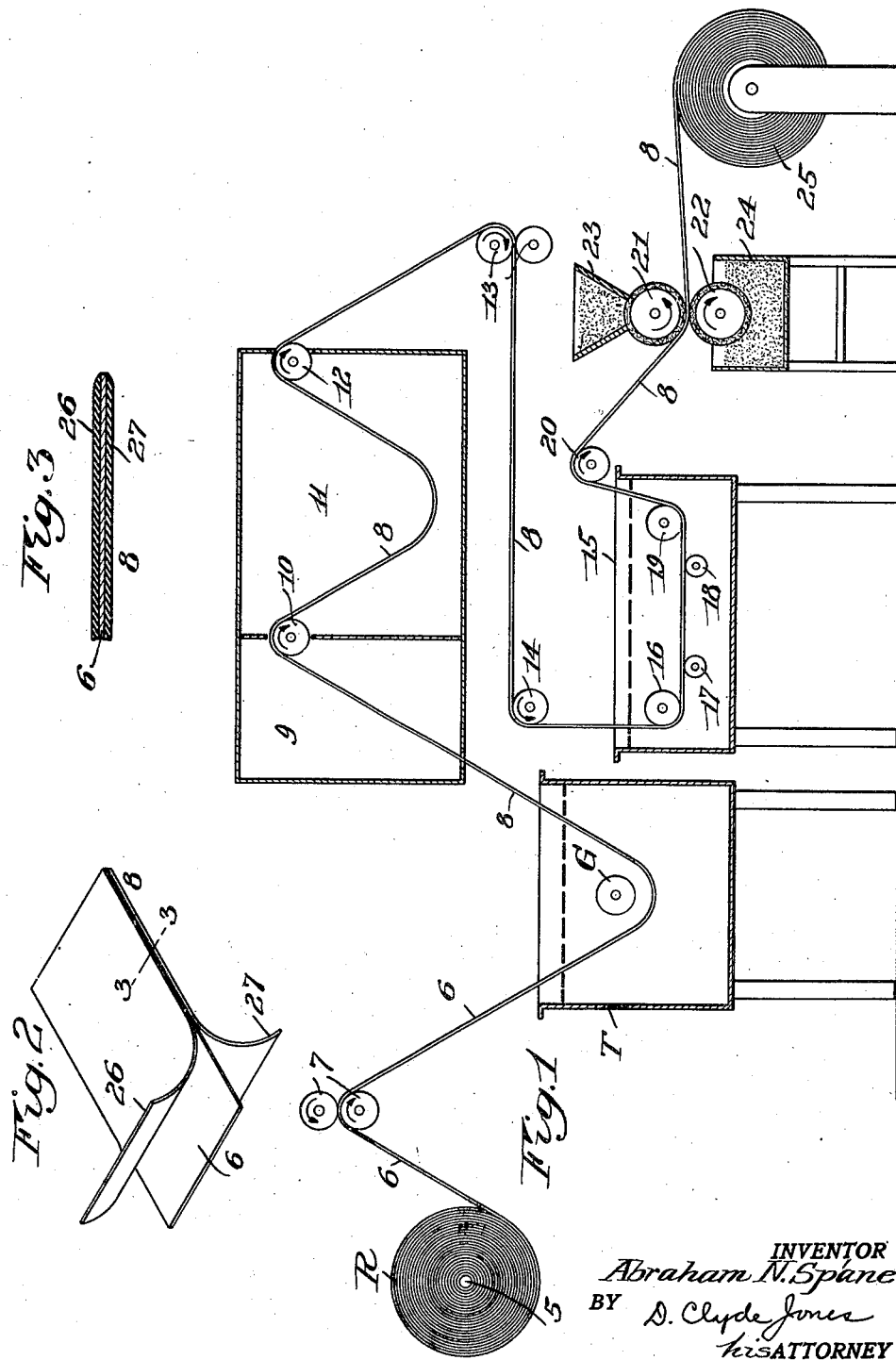

2,120,720

UNITED STATES PATENT OFFICE 2,120,720

METHOD OF MAKING SHEET LATEX ARTICLES

Abraham N. Spánel, Rochester, N. Y.

Application November 14, 1934, Serial No. 752,999

10 Claims. (Cl. 18—57)

This invention relates to the method of making sheet latex articles.

It has been proposed to make sheet latex articles by depositing them on rigid forms of the desired shape of the resulting article. Such forms are expensive to make and a great number of them are required if a large production of the latex articles is desired. According to such a method, it has been the practice to dry or vulcanize such articles on the forms and therefore equipment has been required not only to dip the forms into latex but to move them to and from the drying or curing ovens.

It has also been proposed to deposit a latex sheet on an endless belt of metal or the like, but in such an arrangement, it is possible to deposit a useful layer of latex on only one side of the belt and the deposited layer must be removed from the belt before the latex sheet can be cut into articles of the desired shape. Latex sheets deposited in such a manner tend to wrinkle easily and because of their elasticity tend to stretch during the cutting operation, so that it is difficult to obtain sheets of uniform shape or outline, particularly if very thin.

It has also been proposed to rubberize or impregnate cloth with rubber or latex, but in that case the latex becomes incorporated in the cloth and is not practically separable therefrom.

In the curing of latex articles by one known method it has been customary to subject the articles to hot air. Such articles when they are completely cured in that medium, have a rather "harsh" feeling to the touch. According to another known method, latex articles are cured by subjecting them to boiling water, but such hot water treatment appears to dissolve or leach out some of the accelerator therefrom too readily with the result that the cured latex has a somewhat "mushy" texture, is not durable and ages quickly.

In accordance with the main feature of the present invention, it is proposed to deposit a layer of latex on one or both surfaces of a sheet which serves as a support not only during the operation of depositing the layer or layers thereon but also during the curing operation and while the latex layer or layers are being cut according to any desired outline. The sheet thus serves as a convenient support or form for preventing the latex layers from stretching during the cutting operation. After the layers of latex and the supporting sheet have been cut to the desired size and shape, these layers are removed from the resulting pieces of the sheet upon which the layers were deposited.

An additional feature of the invention relates to depositing an impervious layer of latex on a sheet of metal foil such as aluminum, which serves as a support during the depositing and curing of the latex layer or layers and while the layers and sheet are being cut in accordance with any desired pattern. Under certain conditions the supporting metal foil may have one or both surfaces thereof covered with a sheet or sheets of paper or the like. Also, the metal foil may have, if desired, first applied upon it, a suitable acid or alkali to coagulate the latex on the foil.

In accordance with a further feature of the present invention, latex articles are partially cured by first subjecting them to hot air or gas to a degree such that the accelerator in the latex cannot be dissolved away, and then subjecting the articles thus partially cured to hot or boiling water to complete the curing operation. It has been found that by the combined use of hot air and boiling water, the resulting articles have none of the "harshness" of articles cured solely in hot air and none of the "mushiness" of articles cured solely in hot water, but instead such articles have a somewhat velvety feeling so that an especially satisfactory product results, satisfactory in wear and ageing qualities.

These and other features of the invention will appear from the detailed description and claims.

For a clearer understanding of the invention, reference is made to the drawings in which Fig. 1 diagrammatically represents one method whereby a latex product can be made according to the present invention; Fig. 2 is a perspective view of a piece of the flexible form or supporting sheet with the layers thereon cut to a desired size and with each of the latex layers partially stripped from the form in accordance with the method; Fig. 3 is a cross section taken substantially on the line 3—3 of Fig. 2 illustrating the character of the latex layers at the edge of the flexible form; Fig. 4 diagrammatically illustrates a slightly modified arrangement for performing the method of the present invention; Figs. 5 and 6 are cross sections illustrating two different types of flexible forms coated with latex in accordance with either of the methods shown in Figs. 1 or 4; Fig. 7 is a plan view of a sheet latex article made in accordance with the present invention; Fig. 8 is a diagrammatic showing of a modified arrangement for depositing a layer of latex on a supporting sheet; and Fig. 9 is a fragment of the supporting sheet with a layer of latex deposited thereon by the last-mentioned arrangement.

Referring especially to Fig. 1, R designates a roll of substantially impervious sheet material such as paper or metal foil preferably aluminum foil mounted for rotation on a support 5 so that the sheet of foil 6 can be unwound therefrom. A pair of feed rolls 7 which are preferably driven at a constant speed by any suitable means (not shown), unwinds the foil from the roll R and feeds it at a uniform rate of speed into an open-topped receptacle T containing a bath of liquid latex such as an aqueous dispersion of rubber. The sides of this receptacle, support a guide G preferably in the form of a roller under which the moving sheet of foil 6 passes. It will be understood that as the strip of foil passes through and emerges from the latex bath, it is coated on each of its surfaces with a layer of latex. After being thus coated the advancing strip of foil, now designated 8, passes through a drying oven 9 wherein the latex layers on the sheet are dried. From the drying oven the coated sheet 8 with the layers thereon thus dried, passes over the roll 10 preferably driven at the same peripheral speed as the feed rolls 7, into a curing oven 11 wherein the layers of latex on the sheet are partially cured or vulcanized. A rotating roll 12, having the same peripheral speed as the feed rolls 7 and the guide roll 10, advances the coated sheet 8 to a pair of rotating feed rolls 13 also driven at the same peripheral speed as the previously mentioned rolls. These feed rolls advance the coated sheet 8 which thereafter passes around the guide roll 14, into a tank 15 of hot water wherein the vulcanization or curing of the latex is completed. Suitable guide rolls 16, 17, 18 and 19 mounted in the tank, guide the coated sheet at a uniform speed through the hot water from which the sheet advances over the guide roll 20 and between a pair of felt rolls 21 and 22 which are preferably driven in any suitable manner. These felt rolls serve not only to advance the coated sheet 8, but also to apply to its exposed surfaces dusting powder such as talcum from receptacles 23 and 24, which continuously apply a small amount of talcum respectively to the surfaces of the felt rolls 21 and 22. After being thus dusted, the coated sheet is rewound into a roll 25. Since the layers of latex on the coated sheet 8 are now cured, the roll 25 can be stored away as long as desired until it is ready for use, or it can be taken immediately and fabricated into various sheet articles, such as table covers and rubber sheets and the like.

It will be noted that the latex layers on the coated sheet 8 are partially cured or vulcanized in the curing oven by subjecting them to hot air or gas at a temperature of between 195° F. and 240° F. for a period of fifteen minutes duration so that the latex is not rendered "harsh". Thereafter, these layers are subjected to hot water preferably boiling water for a period of time sufficient to complete the curing or vulcanization. By this combined use, first of hot air or gas and then by hot or boiling water, a cured latex layer is obtained which has none of the "harshness" of latex cured in hot air alone and has none of the "mushiness" of latex cured in hot water only. Instead the resulting latex has a velvety feeling, wears and ages well.

In the further manufacture of articles from the coated sheet 8, this sheet is unwound from the roll 25 and is cut to any desired shape, that is, the foil and the layers thereon are cut according to any desired pattern. In this way, the foil 6 acts as a flexible and easily severed support or form for the latex layers adhering thereto, designated 26 and 27 in Fig. 2, so that they are readily cut into desired shapes without the danger of wrinkling or crookedly stretching. After the sheet 8 has been cut to the desired size, the layers of latex 26 and 27 are removed from the supporting foil or form, thus making two articles by one series of operations. It should be noted that the latex layers 26 and 27 thin out at each edge of the foil as illustrated in Fig. 3, to facilitate easy separation by tearing, of the two deposited layers.

A modified method of making sheet latex articles is diagrammatically illustrated in Fig. 4 wherein a roll R of paper, aluminum foil or like material is immersed in a receptacle 31 containing a bath of liquid latex such as an aqueous dispersion of rubber. It will be understood that the roll R can be partially submerged provided that the foil as it is unwound, emerges from the bath. The roll R is preferably mounted on a support 32 which rotates in suitable trunnions 33 in the ends of the receptacle. According to this modified method, the foil is unwound from the roll at a uniform rate of speed and emerges from the latex bath in the form of a sheet 34 uniformly coated on both sides with a layer of latex. The sheet 34 upon emerging from the bath preferably moves vertically through a heater 35 in the shape of a flue having its walls heated in any suitable manner so that there is a constantly ascending column of hot air or gas enveloping the surfaces of the ascending coated sheet, whereby the latex layers thereon are dried and partially cured or vulcanized. The length of this flue is preferably such that the latex layers on the foil 34 are dried and partially cured before they deviate from their vertical course. After leaving the heater 35, the coated sheet 34 passes over the guide rolls 36 so that the direction of movement of the coated sheet is changed and it descends, at a uniform rate of speed into a tank 37 of hot water preferably boiling water, where the curing or vulcanization of the latex layers is completed. The movement of the sheet 34 through the tank 37 is guided by the guide rolls 38, after which the sheet emerges from the hot water and passes over the guide roll 39 to a pair of rotating dusting rolls 40 and 41. It will be understood that the dusting rolls 40 and 41 have talcum or like material applied to their respective surfaces from the receptacles 42 and 43 so that the exposed surfaces of the sheet 34 are uniformly dusted. After leaving the dusting rolls, the coated sheet 34 passes over the guide roll 44 and is wound into a roll 45 by motor M or is immediately fabricated into latex articles.

In this instance also, the roll 45 may be stored away until it is ready for use, at which time the coated sheet 34 is unwound from the roll and cut into suitable sizes and shapes such as table covers 46 one of which is illustrated in Fig. 7. This table cover, in each of its corners, has slits or cut-out portions 47 adapted to receive the corners of a table top on which it is used. It will be understood that in making this table cover the coated sheet 34 with the latex layer on each side thereof is cut to the shape shown in Fig. 7 and the cut-out portions or slits 47 are also formed therein. Thereafter, the layer on each side of the foil 34 is removed, providing two articles or table covers made simultaneously by one series of operations. The foil or form sheet is of course, rendered unsuitable for further use and becomes scrap material.

While the methods herein disclosed are well adapted for making latex sheets by depositing the latex layers 48 and 49 on an unsupported sheet of foil such as 6 of Figs. 1, 2 and 3 or 34 of Fig. 5, the foil 34 (Fig. 6) may have a backing 50 of porous paper somewhat approaching the character of blotting paper. When such a form or support is utilized, that is foil with a backing of porous paper, it has been found that the latex layer 51 deposited on the exposed surface of the foil is thinner than the latex layer 52 deposited on the exposed surface of the porous paper. Thus by using a form of the character shown in Fig. 6, it is possible to deposit simultaneously two layers of latex of unequal thickness on opposite sides of a moving flexible sheet or support.

In the modified method shown in Fig. 8 a layer of latex is deposited on one surface only of a flexible sheet. According to this method, a sheet of foil 53 or a composite sheet of foil and paper is unwound from a roll R and passes under the guide rollers 54 with the under surface of the sheet in contact with a bath 55 of latex contained in a suitable receptacle 56. It will be seen that if roll R is unwound at a predetermined rate of speed, the guide roll 54 is not necessary, since surface tension alone would be sufficient to hold the foil surface to the latex surface in the coating operation. The sheet 53 by thus contacting the bath is coated on its underside with a layer of latex 57 which sheet is now designated 58. The latex layer on this sheet is then dried and cured according to either of the arrangements shown in either Fig. 1 or 4. The sheet 55 with the cured layer of latex thereon, after being suitably dusted, may be wound into a roll for future use or may be immediately cut into pieces according to any desired pattern, after which the latex layer is removed from the pieces of the sheet.

From the foregoing description it will be evident that the layer of latex may be deposited mechanically, that is, dipped and dried. It may also be deposited by coagulating the latex on the foil by first applying a coating of acid or alkali to the foil before dipping. Also, it will be understood that either unvulcanized or vulcanized liquid latex may be used, and if the latter is used, obviously no further vulcanizing of the layer need take place other than the mere drying of the layer of latex deposited on the foil. The thickness of the layer may be made to vary generally with either the number of successive dippings and dryings, or the intensity of the coagulation process, or by the nature of the absorbing material on the foil itself, or any combination of these provisions.

What I claim is:

1. The method of making sheet latex articles which comprises unwinding a roll of thin flexible sheet material capable of being coated with latex and capable of having the latex coating stripped therefrom, passing the sheet as it is unwound through a latex-depositing region to deposit an impervious removable latex layer on at least one surface thereof as it moves through the said region, drying the latex layer on said sheet, cutting the sheet and the layer of latex thereon into pieces as desired, and stripping the cut latex layer from the cut sheet.

2. The method of making sheet latex articles which comprises unwinding a roll of thin flexible sheet material capable of being coated with latex and capable of having the latex coating stripped therefrom, passing the sheet as it is unwound through a latex-depositing region to deposit an impervious removable latex layer on both surfaces thereof as it moves through the said region, drying the latex layers on said sheet, cutting the sheet and the layers of latex thereon into pieces as desired, and stripping the cut latex layers from the cut sheet.

3. The method of making sheet latex articles which comprises depositing a removable latex layer on both surfaces of a thin, flexible impervious sheet, drying the latex layers on said sheet, cutting the sheet and the layers thereon into pieces as desired, and thereafter stripping the cut layers from the pieces of said sheet.

4. The method of making sheet latex articles which comprises moving through a latex coating region, a length of a thin flexible sheet of a material capable of being coated with latex and capable of having a latex coating stripped therefrom, progressively coating said sheet on both sides with latex during movement thereof until the entire sheet is substantially completely coated with said latex, drying the latex coating while on said sheet, stripping the latex coating in sheet form from said flexible sheet and discarding said flexible sheet.

5. The method of making sheet latex articles which comprises depositing latex layers on both surfaces of a moving flexible sheet of metal foil, drying the latex layers on said sheet, cutting the sheet and the layers thereon into pieces as desired, and stripping the cut layers from said pieces.

6. The method of making sheet latex articles, which comprises at least partially submerging a roll of flexible sheet material capable of being coated with latex and capable of having a latex coating stripped therefrom, in a latex bath, unwinding the sheet of material from the roll while withdrawing the sheet from the latex bath to deposit a layer of latex on a surface thereof, drying the latex while on said sheet, cutting the sheet with the layer thereon as desired, and stripping the layer from the pieces of the sheet.

7. The method of making sheet latex articles, which comprises completely submerging a roll of flexible sheet metal material capable of being coated with latex and capable of having a latex coating stripped therefrom, in a latex bath, unwinding the sheet of material from the roll while withdrawing the sheet from the latex bath to deposit a layer of latex on both surfaces thereof, and drying the latex layers while on said sheet and stripping the layers from said sheet.

8. The method of making latex sheeting, which comprises coating a flexible sheet capable of being coated with latex and capable of having a latex coating stripped therefrom, with layers of latex on both surfaces thereof, drying the coating by moving the coated sheet upwardly in a heated region, completing the curing of the layers on said sheet, cutting the sheet and the layers of deposited latex thereon, and thereafter stripping the layers from the cut sheet.

9. The method of making a latex sheet which comprises depositing an impervious layer of latex on imperforate aluminum foil, drying the layer on the foil, cutting the foil and the deposited layer of latex thereon into pieces as desired, and stripping the cut latex layer from the foil pieces.

10. The method of making latex strips of unequal thickness which comprises depositing impervious removable layers of latex on both sides of a laminated sheet consisting of imperforate metal foil and paper at its respective surfaces, drying the layers on said sheet and stripping said layers from the sheet.

ABRAHAM N. SPÁNEL.